(12) United States Patent
Whitaker et al.

(10) Patent No.: US 6,298,425 B1
(45) Date of Patent: Oct. 2, 2001

(54) COMPUTER DISK MANAGEMENT SYSTEM USING DOUBLET A-B LOGGING

(75) Inventors: Christopher Whitaker, West Lothian; Conor Morrison; Alan Gordon Dewar, both of Edinburgh; James Hogg; Kevin Playford, both of Fife, all of (GB)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/228,662

(22) Filed: Jan. 12, 1999

(51) Int. Cl.[7] .................................................. G06F 12/16
(52) U.S. Cl. ...................... 711/162; 711/161; 711/202; 707/204
(58) Field of Search ............................. 711/4, 112, 114, 711/161, 162, 202, 203; 707/201–204; 714/6

(56) References Cited

U.S. PATENT DOCUMENTS

| | | | |
|---|---|---|---|
| 5,761,677 | * | 6/1998 | Senator et al. ........................ 707/203 |
| 5,761,678 | * | 6/1998 | Bendert et al. ....................... 707/204 |
| 5,897,661 | * | 4/1999 | Baranovsky et al. ................. 711/170 |

OTHER PUBLICATIONS

Mohan, C. et al., "ARIES: A Transaction Recovery Method Supporting Fine–Granularity Locking and Partial Rollbacks Using Write–Ahead Logging," *Computer Science*, Jan. 19, 1989, pp. 1–45.

* cited by examiner

*Primary Examiner*—Matthew Kim
*Assistant Examiner*—Denise Tran
(74) *Attorney, Agent, or Firm*—Hamilton, Brook, Smith & Reynolds, P.C.

(57) ABSTRACT

Updating a single block of metadata is optimized into a single I/O operation. Resilience against single block failure and system crashes with a single or less than three I/O operations is provided. The present invention method and apparatus stores two copies of the metadata in two areas on disk. Each individual block of metadata in each area is duplicated as a doublet. The doublet provides two copies of a subject block to be written to disk as a single I/O. This enables metadata to survive a single block failure since such a failure only affects half of the doublet. Further, each block of metadata has header information including an indication of transaction and a part count. A transaction is not deemed committed until corresponding blocks of all parts are found.

20 Claims, 4 Drawing Sheets

COMPUTER DISK MANAGEMENT SYSTEM USING DOUBLET A-B LOGGING

BACKGROUND OF THE INVENTION

In general, a computer disk holds blocks of data. The disk blocks are numbered, starting at 0 and sequentially proceeding up to the total number of blocks on the disk (less one). The disk blocks are addressed using Logical Block Numbers, or LBN's for short.

An application stores its data persistently on disk within named files. Each file consists of blocks of data, where each block is a sequence of consecutive bytes. Typically, the sequence of consecutive bytes is in the range of 512 bytes up to several kilobytes (fixed by the design of each disk). Blocks within a file are numbered from 1 up to the current maximum in the file. These blocks are addressed using Virtual Block Numbers, or so-called VBN's. Note that the term VBN only has meaning within a specified file. For example, two files can both contain a VBN3, but the content of VBN3 for the two files is totally unrelated. Moreover, these two VBN's are stored on the disk at completely different LBN's.

Figure 1:
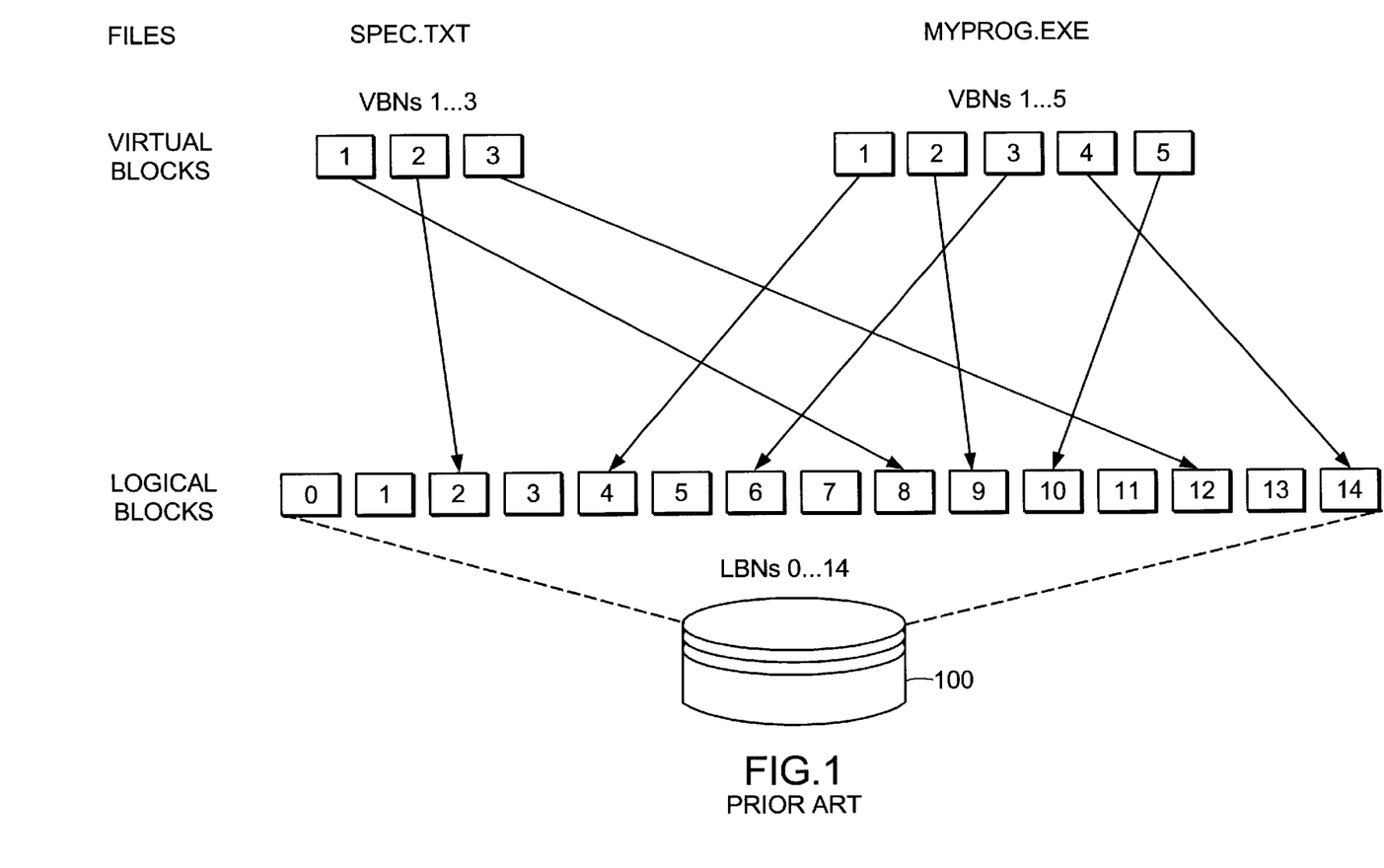
FIG. 1 is a schematic illustration of virtual block to logical block mapping.

FIG. 1 is illustrative of the foregoing. Referring to FIG. 1, two small files labeled "spec.txt" and "myprog.exe" are shown. "spec.txt" contains VBN's 1 through 3, while "myprog.exe" contains VBN's 1 through 5. VBN1 of "spec.txt" is held in LBN8 of subject disk 100; spec.txt VBN2 is held in LBN2 and so on. The layout on disk 100 of these two files is summarized in the table below:

| spec.txt | | myprog.exe | |
|---|---|---|---|
| VBN | LBN | VBN | LBN |
| 1 | 8 | 1 | 4 |
| 2 | 2 | 2 | 9 |
| 3 | 12 | 3 | 6 |
| | | 4 | 14 |
| | | 5 | 10 |

The component of software that remembers the mapping from file VBN's to the disk LBN is called the file system. The file system takes care of allocating, freeing and remembering which logical blocks are used by which virtual blocks within each file at any instant. The file system also remembers the names given by applications to each file and how these files are held together in a directory tree. The file system stores this metadata (e.g., the VBN to LBN mapping) on blocks of the disk that it keeps for its own use, but which applications do not normally access.

So an application conducts its operations in terms of reading and writing blocks of data to a file called by some convenient name, for example "[accounts.monthly]January.details". An application can choose to extend the file, or to truncate the file, either action can change the number of virtual blocks in the file. The file system accepts those requests from the application, expressed as operations upon VBN's within named files, and ultimately turns them into reads and writes upon LBN's for data stored on the disk. The mechanical details of the reads and writes to LBN's on the disk for the file system are handled by another software component that is specific to the disk and called the device driver.

The file system metadata blocks must be stored persistently in reserved memory, i.e., permanently across computer reboots within reserved areas of the disk.

One approach for maintaining persistent metadata is known as "A-B Logging". See "Transaction Processing: Concepts and Techniques" by Jim Gray and Andreas Reuter in *Morgan Kaufmann Series in Data Management Systems*. In A-B logging, the subject metadata is written to blocks in area A of the disk. A copy of those blocks is made in area B of the disk, where A and B are separate and distinct areas of the disk. The metadata stored in area B are used until a block failure or other failure occurs. In that event, area A serves as a backup copy of the metadata. This meets the requirements of 3. above. However, maintenance of such dual areas imposes a high overhead (against requirement 4. above).

Similarly, redo logging, undo logging or a mixture of both types of logging may be used to provide atomic updates to a number of disparate pieces of metadata. See C. Mohan, D. Haderle, B. Lindsay, H. Pirahesh and P. Schwarz, "ARIES: A Transaction Recovery Method Supporting Fine-Granularity Locking and Partial Rollbacks Using Write-Ahead Logging," *ACM Transactions on Database Systems* 17, No. 1 (March 1992). This solution involves writing the updates to a sequential log before updating the disk locations of the metadata. Once the operations have been written to the log, the operations are said to be committed, in other words, the metadata changes are stable and persistent. A background task is required to roll the changes written in the log to the disk location. While this can be done at leisure, additional I/O's are required, thus lowering the theoretical maximum throughput, particularly where most operations are a single block update.

In another approach called ABC Update, if metadata requires 100 blocks of space, then the disk management system allocates three times this amount at the start of the target disk. The three allocated areas are called the "A", "B" and "C" area, and when the disk management system is transactionally consistent, the three areas contain identical copies of the 100 blocks of metadata. To provide persistence, the ABC update approach provides an AddRecord operation that write-locks some metadata block, F, which is known to hold some free slots, and modifies the in-memory copy of that block to reflect the fact that it selects one of these free slots for use. The ABC update approach then write-locks the metadata block, M, that will map the new user record, R, (in effect it is a mapping from the key field in record R to the slot where that records is actually stored within the disk). The in-memory copy of that block is then updated to hold this new mapping. The disk management system then writes out record R to the selected slot. Once that is complete, the disk management system writes out metadata blocks M and F to their locations in the "A" area. Once complete, the disk management system does the same to the "B" area. In turn, the disk management system does the same to the "C" area.

Note that each transaction always writes to A, B and C areas in that order. In total, using the ABC update approach, the disk management system performs one user write, followed by six metadata writes; however, those metadata writes are done as three pairs, where each pair is issued to the underlying device driver in parallel.

After all these writes have completed, the transaction releases its exclusive write lock on metadata blocks M and F and acknowledges successful addition of the user record back to the caller. Each block in each metadata area includes a headlet that describes a transaction of which it forms a part. The headlet is formed of a "TxNum" part and a "TxSize" part. The "TxNum" part is a 64-bit integer which uniquely identifies the transaction. And the "TxSize" part holds a value which indicates the total number of metadata blocks involved in the transaction. Note that writes to any one metadata area are issued in parallel—the disk is allowed to reorder parallel I/O's, and therefore metadata blocks M and F may be updated in either order.

Consider first the case where there are no disk errors—all blocks can be read by recovery. In this simplified case, all one needs is an "A" area and a "B" area; the "C" area is not required. Suppose the system just has ten blocks of metadata. Before a subject transaction, the on-disk state is, happily, transactionally consistent and shown below.

| Block | 1    | 2    | 3    | 4    | 5    | 6    | 7    | 8    | 9    | 10   |
|-------|------|------|------|------|------|------|------|------|------|------|
| A     | 27.2 | 39.1 | 37.2 | 27.2 | 35.1 | 37.2 | 41.3 | 41.3 | 38.1 | 41.3 |
| B     | 27.2 | 39.1 | 37.2 | 27.2 | 35.1 | 37.2 | 41.3 | 41.3 | 38.1 | 41.3 |
| C     | 27.2 | 39.1 | 37.2 | 27.2 | 35.1 | 37.2 | 41.3 | 41.3 | 38.1 | 41.3 |

This table shows the transaction headlet in each of the ten metadata blocks, for areas A, B and C. The contents of the three areas are identical. The two numbers in each box represent the transaction identifier "TxNum", followed, after the dot, by "TxSize" the number of metadata transaction blocks involved in the transaction. One can see six transactions, identified by TxNums 27, 35, 37, 38, 39 and 41. They are all complete. For example, transaction 27 affected two blocks, namely block numbers 1 and 4. The same holds true for the other (five) transactions.

Consider a new AddRecord transaction. It is allocated the next unused transaction identification number 42, and it updates blocks 4 and 8, for example. The transaction headlet in these blocks must therefore be 42.2.

Now suppose that the system fails just after writing lock 4 but before writing block 8. Recovery will then see the situation below.

| Block | 1    | 2    | 3    | 4    | 5    | 6    | 7    | 8    | 9    | 10   |
|-------|------|------|------|------|------|------|------|------|------|------|
| A     | 27.2 | 39.1 | 37.2 | 42.2 | 35.1 | 37.2 | 41.3 | 41.3 | 38.1 | 41.3 |
| B     | 27.2 | 39.1 | 37.2 | 27.2 | 35.1 | 37.2 | 41.3 | 41.3 | 38.1 | 41.3 |
| C     | 27.2 | 39.1 | 37.2 | 27.2 | 35.1 | 37.2 | 41.3 | 41.3 | 38.1 | 41.3 |

Recovery will repair this situation by starting with the metadata block 1. The Recovery routine reads the version in the A area into that metadata's block in-memory buffer. It then reads the version in the B area and compares their transaction headlets. If the headlets agree, Recovery overwrites version A from memory onto version C, bringing A, B and C into harmony. Often this overwrite will be unnecessary—however, it is cheaper to overwrite the metadata block in C area than it is to compare contents in order to avoid a redundant overwrite.

On the other hand, if versions A and B disagree, metadata block 1 will be added to a list of in-doubt transactions. Recovery repeats this process for each metadata block. As it makes additions to the in-doubt list, it checks whether the new addition completes a prior listed in-doubt transaction. If so, the Recovery routine writes the A version of all metadata blocks involved in that transaction to areas B and C, then removes it from the in-doubt list.

Below is an example of the in-doubt list. Here transactions 22, 25 and 27 are currently in doubt. The corresponding "TxSize" for transaction 22 indicates three metadata blocks involved in the transaction. The Recovery routine is required to find all three partners of transaction 22 before it is no longer in-doubt, but so far only two partners have been found (namely, metadata blocks 4 and 7), as illustrated in the table below. Similarly, for transactions 25 and 27, only one of two respective partners have been found.

| TxNum | TxSize | Metadata Blocks |   |
|-------|--------|-----------------|---|
| 22    | 3      | 4               | 7 |
| 25    | 2      | 6               |   |
| 27    | 2      | 9               |   |

Having read all the metadata blocks, if there are any transactions still left in-doubt, then the Recovery routine rolls back those transactions by copying version B of each metadata block involved into both area A on disk and area C on disk, and into the in-memory buffer. The last action of Recovery is to decide the next TxNum to be issued, as simply one higher than the highest TxNum it encountered during Recovery. Also it sets an indication of the last transaction on (i.e., committed to) disk as TxHard=TxNum −1. That completes ABC Recovery with no disk failures.

The C area is needed as well as the A and B areas to enable recovery from a single block write failure in the presence of disk failures, such as spontaneous decay of a metadata block. That is, if the write of any metadata block to area A were to fail midstream due to, say for example, a system crash and leave garbage in that block, then after rebooting, the recovery routine as mentioned above falls back to old contents of that metadata block held in the B area. In addition, however, if the companion metadata block in the B area has spontaneously decayed, then the recovery routine uses the third copy (in C area) to fall back upon. Thus, ABC recovery in the presence of disk errors considers three possible states of each metadata block.

(i) Old—meaning that the transaction did not get so far as updating the block with the data for the subject transaction, so the block still holds the previous data.
(ii) New—meaning that the transaction successfully updated the block with the data for the subject transaction.

(iii) Parity—meaning that the Recovery routine obtains a parity error when attempting to read the block. This may be caused either by an incomplete write operation or by spontaneous decay of that disk block since it was last successfully written.

The Recovery routine, as mentioned earlier, looks across all the metadata blocks that comprise a transaction in order to decide whether to roll forward or roll back any part-completed transaction. Further, the Recovery routine determines whether a metadata block contains old or new versions of their data by comparing their transaction headlets. Recovery of a transaction is then as follows.

If the Recovery routine can read all three versions in areas A, B and C of the metadata block, then the Recovery routine applies the newest version of the data across the A, B and C areas of the block. Thus, if a write of the metadata block to area A was underway at the time the system failed, then upon reboot the recovery routine rolls the data forward by writing the A area onto B and C areas of the metadata block. If the metadata block was being written to area B at the time the system failed, then the Recovery routine rolls forward by writing A (or B) onto C area of the metadata block.

If the Recovery routine can only read two versions of the metadata block, and one version is newer than the other, then the recovery routine applies the newer of the read versions to the other two versions thus effecting a roll forward.

If the Recovery routine can read only two versions of the metadata block and the two versions have the same transaction number, then the Recovery routine applies either one to the third version. The two good versions may be both in the old state or both in the new state of the metadata, and the Recovery routine cannot differentiate these two cases. However, the Recovery routine accomplishes a roll forward throughout the three versions of the metadata block or a roll back through the three versions of the metadata block. In either case, the metadata is made to be transactionally consistent.

If the Recovery routine can read only one version of the metadata block, then the routine applies that version to the other two versions. This effects either a roll back of all three versions of the metadata block or a roll forward in certain circumstances. In either case, the resulting metadata is transactionally consistent.

Note that the Recovery routine may be interrupted at any point. If, for example, the system fails part way through Recovery, when it reboots, Recovery is able to safely follow the same routine, upon whatever it finds on disk. In other words, Recovery is an idempotent operation.

Although the ABC updates approach for persistence is resilient to single block spontaneous decay and single block write failure, and recovery is idempotent, the cost for this robustness is a drop in performance. Because each update to even a single metadata block requires that the system perform three serial writes (i.e., the next write cannot be issued until the previous one has completed), some performance is lost.

Thus there is a need in the art for improved maintenance (persistence and recovery) of disk metadata.

SUMMARY OF THE INVENTION

The present invention overcomes the foregoing problems of the prior art. In particular, standard logging techniques require that data is written to the log and subsequently, the update is made to the disk location of the data. This forces additional complexity in the normal running case. In other words, logging requires that an asynchronous thread of execution is used to update the disk location. In addition, the log in a logging scheme is a finite size. This means that background management is required to ensure that there is space in the log so that further operations can continue.

The present invention removes any need for additional complexity during normal running and does not require additional I/O operations. In particular, the present invention optimizes the common case of updating a single block of metadata into a single I/O operation.

Further, without duplicating data and log records, the prior art logging techniques do not provide a mechanism to survive a single block failure. The prior art AB logging approach requires that both the A area and the B area are updated to survive a single block failure. To make this resilient to system crashes, these I/O operations must be done synchronously. In other words, the A area must be updated before the B area can be updated. The present invention provides resilience against single block failure and system crashes with a single I/O operation.

Specifically, the present invention provides a doublet AB logging method and apparatus to update one or more persistent data structures in a transactionally consistent way. In other words, the present invention method and apparatus allows multiple metadata blocks to be updated in a single atomic unit, in a way that survives write failure during the operation itself and is able to recover from spontaneous single block failures of the underlying media.

In the preferred embodiment, the present invention achieves the foregoing by combining three techniques:

(i) Keeping two copies of the metadata. The metadata is stored in two areas called the A area and the B area. The areas are updated in turn one at a time. Initially a metadata update is made to the A area. The next update to the same piece of metadata is made to the B area. This means that at any one time one area contains the last metadata that was written (in other words the current version) and the other area contains the previous version of the data. A transaction may consist of multiple updates to different blocks. Each block is written in such a way that the previous version of the corresponding block is preserved in the other area for that block. If the whole of the transaction is not completed, the old version of the metadata (for each block) that has been updated is still on the disk and is able to be used (in a rollforward or rollback) to reconstruct the full, committed state of the metadata.

(ii) Accounting of transaction. The various blocks that are updated as a single transaction are marked as belonging to the same transaction. By scanning the metadata, it is possible to determine those transactions that have completed and those which need to be rolled back. Each block of metadata is stamped with a transaction number and a part count when it is written to the disk. For example, a block is stamped with a transaction number, say for example 10, and a part number, for example part 1 of 3. Only if all parts of in-doubt transactions are found is the transaction said to be committed. As blocks are overwritten, the old transaction number and part is lost, therefore if block A contains transaction 10, part 1 of 2, and it is overwritten with another transaction, the whole transaction 10 is no longer on disk. Therefore, the transaction accounting method has the concept of TxHard to describe those transactions that are in-doubt.

(iii) Duplicating each block of metadata. Each individual block in the A area and B area is duplicated as a doublet. In other words, there are four copies of each metadata block on the disk. Rather than write a single block of metadata, the present invention writes a doublet. This is a two-block, single I/O, where the two blocks contain duplicate copies of the same metadata block. By writing a doublet, two copies of the current block are written to disk as a single I/O. This allows the metadata to survive a single block failure since such a failure only affects half of a doublet.

By combining the foregoing techniques, the A-B doublet logging approach of the present invention provides updating a single block of metadata in less than three I/O operations, and preferably in a single I/O (two blocks), while still providing the atomicity and reliability guarantees required. In a preferred embodiment, the invention method is applied to snappy disks (described below).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
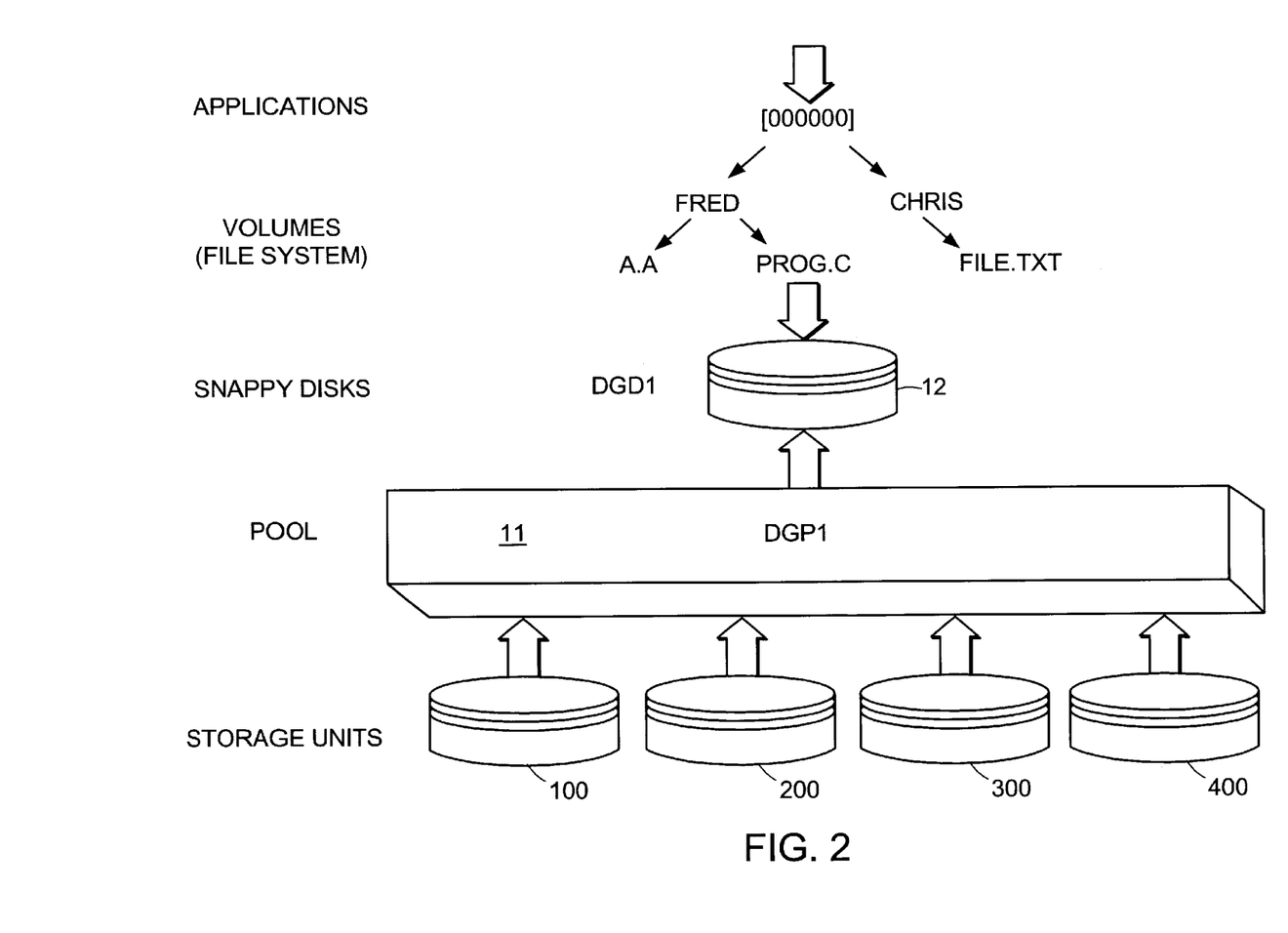
FIG. 2 is a schematic illustration of the pooling of storage units to form snappy disks.

One type of virtual disk called a snappy disk (or snap disk) is proposed by assignee as follows. A number of physical disks, virtual devices and/or storage units are combined into a storage pool. Individual virtual disks known as snap disks or snappy disks are carved out from the storage pool. Each physical disk/storage unit must be dedicated to the pool, e.g., two different pools cannot be created on one storage unit. FIG. 2 shows a pool 11, exported as DGP1 that is made from four physical disks (storage units), 100, 200, 300 and 400. A snappy disk 12, DGD1 has been created and exported from the pool 11.

Snap disks look and behave in exactly the same way as a real, physical disk and are used by applications with no knowledge that the disk is not a real disk. In other words, a snappy disk provides a set of LBN's numbered from 0 or, that can be read or written by an application or file system.

In addition, snappy disks have one very important feature that sets them apart from physical disks. A snap disk can be snapshotted. That is, the system manager can create a "freeze frame" of the snappy disk at any time, without interrupting the I/O's of other users. The "freeze frame" of a snappy disk is called a "snap". Restated, with a single management operation, an exact copy of the virtual disk can be created. This copy appears to applications as another disk that has the same content/data as the original disk at the point in time that the snapshot was created. The snap is able to be treated just like any other snappy disk, but initially takes up no disk space. To begin with, the contents of a snappy disk and its snap are identical, thus the snappy disk and the snap share the same disk blocks of data. In other words, there is only a single copy of the data. As the applications and users change the data stored on the snappy disk, the contents of the snappy disk and its snap diverge. At this point, the snap starts to take up disk space. A disk manager has to store the blocks of data that are different between the original snappy disk and its snap. In other words, the disk manager has to store the new, changed data for the snappy disk as well as the old data for the snap.

For example, when a snap is first created, LBN100 in the snap contains the same data as LBN100 in the snappy disk. The disk manager arranges that the snappy disk and the snap share the same disk block of data. If a user writes new data to LBN100 on the snappy disk, this must not affect the snap. Therefore, the disk manager has to arrange that there are two copies of LBN100, the new data for the snappy disk and the original data for the snap.

The snap is permanent and non-volatile, meaning that it does not disappear until the snap is deleted. The snap does not disappear if the original snappy disk device is dismounted or if the computer crashes.

The storage space provided by a snappy disk or snap is presented to the file system as a contiguous LBN space. When a snappy disk is created, space is allocated from the storage pool. Because the space allocated to the snappy disk may span multiple storage units in the pool, the disk manager needs to maintain mapping information that identifies the mapping between a snappy disk LBN and an LBN on a storage unit in the pool. To avoid confusion, the disk manager calls the LBN's on the storage units Disk Block Numbers, or DBN's.

Keeping a mapping of LBN to DBN for every LBN and every snappy disk or snap would incur a significant overhead. Remember that the disk manager needs to look up this mapping each time a specific LBN is requested and therefore, for speed of access, the disk manager would like to keep this mapping in memory. To reduce the amount of memory used for mapping information, the disk manager breaks up the LBN space into so-called "segments". A "segment" is simply a number of consecutive LBN's in a snappy disk LBN space. The segment is the smallest unit that is tracked by the disk manager mapping structures.

Segments are stored on storage units in frames. A frame is a segment size chunk of DBN space. Each segment is stored in a frame. However, multiple segments may reference the same frame. This case occurs when a snappy disk and a snap have not diverged. This is very similar in the concept of virtual memory (a segment corresponds to a page in the virtual address space and a frame corresponds to the page of physical memory used to store the virtual page).

Figure 3:
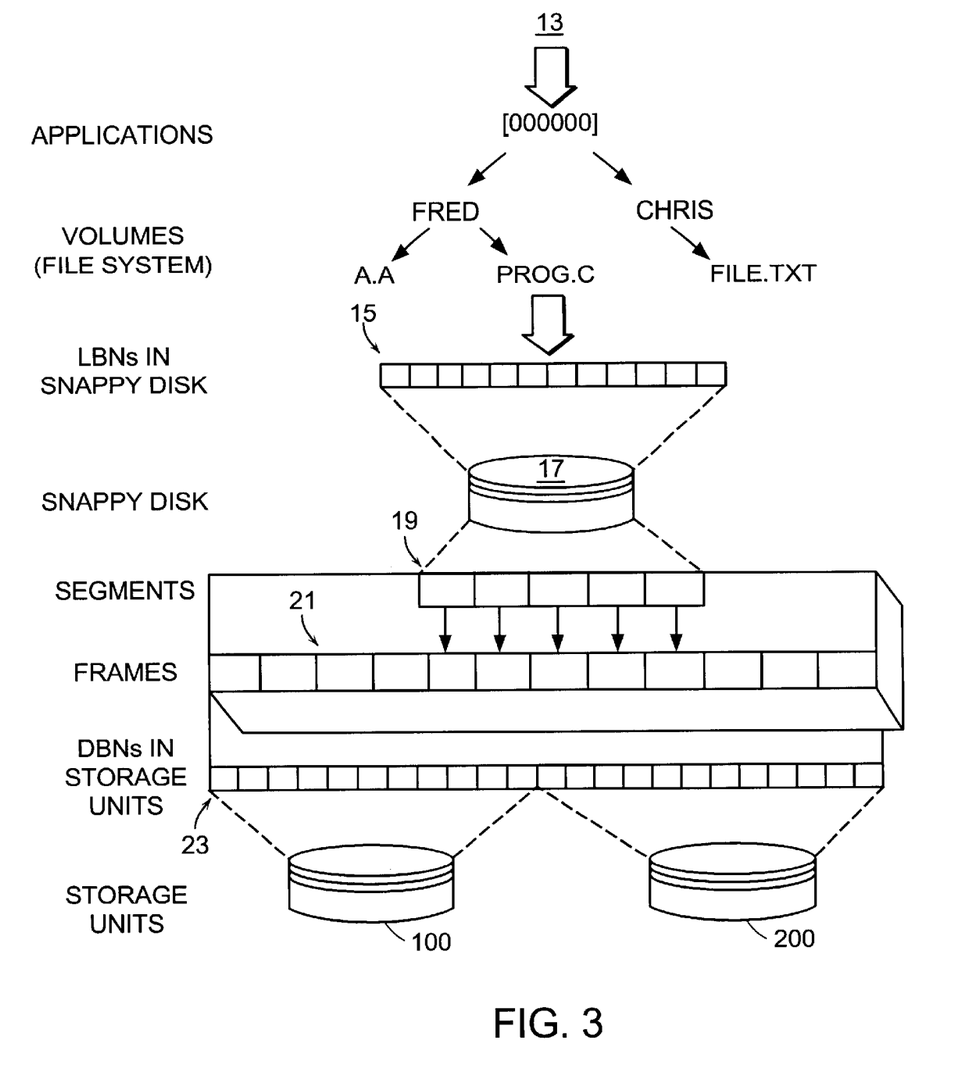
FIG. 3 is a schematic diagram of a hierarchy of mapping information from LBN's in a snappy disk to segments, frames and DBN's in a storage unit.

With the additional mapping entities, the disk manager presents a hierarchy of mapping information, as illustrated in FIG. 3. At the application end 13 of the hierarchy, there are LBN's 15 which address one block of data, 512 bytes, in a volume of a snappy disk 17. In a succeeding level from the LBN's are segments 19 which divide the snappy disk 17. Succeeding the segments 19 in the hierarchy are frames 21. One of frames 21 may map to ten DBN's 23 of an underlying storage unit 100, 200. Thus DBN's 23 at the storage unit end of the hierarchy address one block of data (512 bytes) on the storage unit 100, 200.

Each of the two storage units 100 and 200 presents a range of DBN's 23. These storage units 100, 200 have been bound together to create a storage pool. A snappy disk 17 has been created within the storage pool. When the snappy disk 17 was created in the pool, it consumed a number of the available segments 19 from the pool and now presents a contiguous range of LBN's 15 to the file system. The segments 19 and frames 21 map one to one for this snappy disk 17.

To provide the foregoing snapshot functionality, the disk manager must maintain metadata to describe the location of the user data on the various physical disks/storage units 100, 200 making up the storage pool. This metadata must be persistent across machine reboots and therefore stored on the physical disk (storage unit) 100, 200 in the storage pool. By metadata, Applicants mean the information that describes a pool and where segments have been stored within the pool. Metadata describes location of user data on physical disk (or a storage unit). Metadata may be contrasted with user data which is simply the bytes of information which users of snappy disks, e.g., applications, databases, record management packages, file systems, and so, store within the pool.

While a snappy disk is running, it keeps its metadata within structures held in memory, for example, SDMB's, SegMaps, RootMaps. But because it is held only in memory, all of this metadata would be lost whenever one dismounted a snappy disk or when one unbound the pool or when a computer node crashed during operation. In order to find all of the user data stored within the pool, the snappy disk metadata must therefore be stored persistently, i.e., permanently across computer reboots, within reserved areas of the pool.

In addition to being persistent, the metadata must survive common disk failure modes.

Making snappy disk metadata persistent is much more complicated than simply writing that data on the disk/ storage unit. There are five reasons for why the task is more complicated, as follows:

1. The on-disk metadata cannot be allowed to lag behind the in-memory version of metadata. Therefore, each time the in-memory metadata is modified, it must be updated on disk. However, one cannot afford to write all of the metadata to disk each time a small part of it is modified—its total volume is just too large. Therefore, ideally one must be able to write only that part that has changed.

2. One single snappy disk operation—for example, writing 200 bytes of user data to a segment that is shared by Root and Snap—can cause several items within the metadata to be changed. In general, these changed items do not lie close to each other in memory—and correspondingly, their locations on disk do not lie adjacent either. One therefore needs to be able to update several different, disjoint areas of metadata on disk as one atomic operation, i.e., as a single transaction. That is to say, if one crashes half way through writing those disjoint areas, when the node reboots, one must be able to recognize that the metadata on disk represents an incomplete state—that it captures only part of a complete operation. Not only must one be able to recognize this situation, one must be able to repair the on disk metadata so that it once again reflects a state which includes only fully completed transactions, that is, the on disk metadata must be recovered to a state which is transactionally consistent.

3. A snappy disk must tolerate the loss of any one block of its metadata. This loss can happen due to a power fail, or crash, while it is in the process of being written, or by its spontaneously decaying. By tolerate, Applicants mean that, as a result of losing any one disk block of its metadata, the snappy disk must on no account lose any of the user data it stores. Applicants call this feature/requirement: resilience to single block failure.

4. Whatever scheme is used, it must impose minimal overhead compared with access to a naked disk. In practice, one would like to perform no more than a single I/O to update metadata in addition to the regular I/O needed to perform the transfer of user data.

5. When a storage unit in a pool is initialized, snappy disk software can quickly calculate how much space on that unit is required to hold metadata, and easily decide where to place that metadata. However, Applicants prefer to incur the overhead of writing to each block within the metadata area. Therefore, the persistence scheme must be able to recognize any block read from the metadata area as one that has never been written to in the lifetime of this storage unit within the pool.

In summary, to provide the snapshot functionality of the snappy disk described in FIGS. 2 and 3, the disk management system must maintain metadata to describe the location of the user data on the various physical disks/storage units forming the storage pool. This metadata must be persistent across machine reboots and is therefore stored on the physical disks in the storage pool. As well as being persistent, this metadata must be able to survive the most common disk failure modes (e.g., spontaneous decay).

The present invention computer disk management system provides such storage and maintenance of metadata on the physical disks. Specifically, the present invention achieves the following goals:

The on disk version of the metadata is not allowed to lag behind the in memory version of the metadata.

A single user-level operation may result in a number of disparate changes to the metadata. These changes are done atomically. In other words, all of the updates resulting from a single user-level operation succeed or none of them must.

The metadata is able to tolerate incomplete writes. If the power fails part way through the I/O operation, the state of the on-disk blocks is non-deterministic. The disk may contain the old data, the new data, or in the case of some types of disk devices, may contain invalid data (marked as a parity error).

The metadata tolerates the loss of any single block on the disk. This has been determined to be the most common form of disk failure that the present invention should protect against.

Most user level operations that result in metadata changes result in changes to a single block of metadata. This is the most optimal path resulting in a single small I/O operation.

The present invention disk management system employs a doublet AB, or DAB, persistence/transactions/recovery method. The invention doublet AB approach achieves the same requirements as ABC persistence—multi-block atomic transactions with tolerance to write failures and single-block spontaneous decay—but with a much higher performance. Instead of performing three sequential writes for every transaction, the DAB approach performs just one I/O operation (write).

Figure 4:
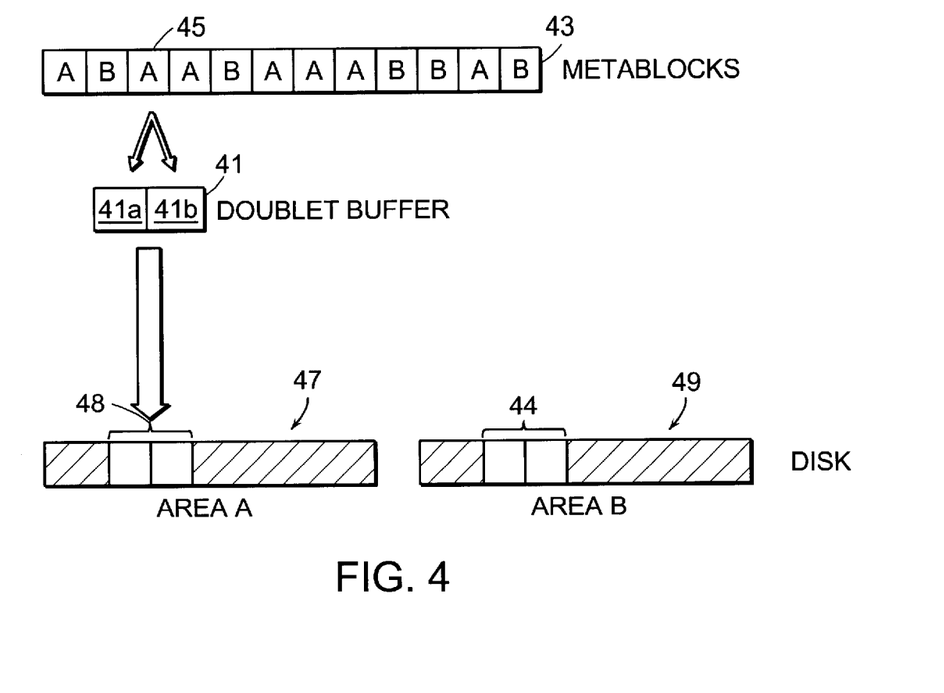
FIG. 4 is a schematic illustration of doublet logging of the present invention.

Referring to FIG. 4, suppose a snappy disk requires 100 metadata blocks 43. With the invention DAB approach, the disk management system allocates twice this amount—i.e., 200 blocks of disk space 47, 49. Each adjacent pair of disk blocks is referred to as a doublet 48, 44. Doublet 1 holds two identical copies of metadata block 1, Doublet 2 holds two identical copies of metadata block 2, and so on.

This first run of 100 doublets is called the A area 47. Then the disk management allocates the same amount of space again, for the B area 49 formed of doublets like 44. Thus, in total, the disk management system has allocated 400 blocks for metadata 43, compared with just 300 blocks for the ABC scheme of the prior art.

Whenever the snappy disk decides to write metadata block 45 for example, the disk management system allocates a Doublet buffer 41 in memory and copies metadata block 45 into both halves 41a and 41b of the Doublet buffer 41. Next, the disk management system writes the buffer 41 contents, in one I/O operation, to the doublet 48 in the A area 47 on disk. When this write completes, the disk management system toggles an in-memory bitmap to indicate that the next time snappy disk needs to write metadata block 45, the disk management system should write to the disk B area 49 (i.e., doublet 44). Each successful write of a metadata block (from 43) toggles between writing disk areas A and B (47 and 49, respectively). The disk management system starts by setting all toggles to the A area 47 when that Root is created.

In FIG. 4, the array of metadata blocks 43, as they are held in memory, and effectively the in-memory bit map is illustrated. Each one is marked with an A or a B to denote which disk area should be used when this metadata block is next written to disk.

The basis behind the invention DAB is that while writing one block of a doublet 48, 44, the worst that can go wrong is that the system may incur a write failure. On Recovery, the disk management system then has three other versions (i.e., the other half of the subject doublet 48, 44 plus the pair of blocks forming the corresponding doublet 44, 48 in the other disk area) of that block with which to perform a roll forward or a roll back. Assuming that the disk management system needs to survive a spontaneous decay in these three other blocks, recovery is guaranteed as follows.

DAB Recovery—No Disk Failures

For a single member transaction, the Recovery routine uses the metadata block (from 43) whose transaction number, comparing A area 47 and B area 49, is higher. For a multi-member transaction, the Recovery routine adds each incomplete metadata block to the in-doubt list. Recovery then rolls back any transactions which cannot be rolled forward, just as in the case of ABC Recovery.

DAB Recovery—Including Disk Failures

In the case of a one-member transaction, suppose that the transaction is writing the metadata block Doublet to area A 47. Zero, one or two errors may be encountered, as shown in the following table:

|  |  | Zero-Error | Single-Error |  |  |  | Double-Error |  |  |  |
|---|---|---|---|---|---|---|---|---|---|---|
|  |  | 1 | 2 | 3 | 4 | 5 | 6 | 7 | 8 | 9 |
| Band 1 | A | old | D | old | old | old |  |  |  |  |
|  |  | old | old | D | old | old |  |  |  |  |
|  | B | old | old | old | D | old |  |  |  |  |
|  |  | old | old | old | old | D |  |  |  |  |
| Band 2 | A | new | D | new | new | new | W | W | W | W |
|  |  | old | old | D | old | old | old | D | old | old |
|  | B | old | old | old | D | old | old | old | D | old |
|  |  | old | old | old | old | D | old | old | old | D |
| Band 3 | A | new | D | new | new | new | new | D | new | new |
|  |  | new | new | D | new | new | W | W | W | W |
|  | B | old | old | old | D | old | old | old | D | old |
|  |  | old | old | old | old | D | old | old | old | D |

This table of failures has 23 cases to analyze. And as for ABC Recovery, parity errors may be encountered during read of zero, one or two metadata blocks in the doublet set of four blocks. And, just as before, these errors may be caused by a write failure (shown as W in the table) or spontaneous decay (shown as D in the table).

In the case of zero errors, Recovery is as described above for ABC Recovery.

In those cases where a single error is encountered during read, the single-member transaction is recovered from among the remaining three good copies of the metadata block. This is accomplished by either a roll back or roll forward. In fact, the invention DAB approach is so resilient to disk failures that among the 14 single-error cases in the table above, there is only one case where the transaction cannot be rolled forward (see Band 2, column 6). None of the cases in Band 1 in fact require any recovery.

In the case of a multi-member transaction, the multiple metadata blocks 43 that comprise the transaction are each in one of three states: the old version, the new version or both. Just as for ABC Recovery, if the Recovery routine can read all four versions (both blocks of doublet 48 in area A and corresponding doublet 44 in area B) of the metadata block, then the Recovery routine applies the newest version of the data across the area A doublet 48 and the B area doublet 44, of the metadata block. Thus, if a write of the metadata block to area A 47 was underway at the time the system failed, then upon reboot the recovery routine rolls the data backward by writing area B 49 onto area A 47 of the metadata block. If the metadata block was being written to area B 49 at the time the system failed, then the Recovery routine rolls the data forward by writing the newest version of data in area A 47 onto area B 49 of the metadata block.

If the Recovery routine can only read three versions (doublet 48 in area A and 1 block in 44 of area B, or doublet 44 of B area and 1a block in 48 of area A) of the metadata block, and one version is newer than the other, then the recovery routine applies the newer of the read versions to the other versions (doublet halves of A area 47 and B area 49) thus effecting a roll forward.

If the Recovery routine can read only two versions (doublet 48, 44, i.e., 2 blocks in either areas A and B, or half doublet, i.e., 1 block in each of area A 47 and B area 49) of the metadata block and the two versions have the same transaction number, then the Recovery routine applies either one to the other versions. The two good versions may be both in the old state or both in the new state of the metadata, and the Recovery routine cannot differentiate these two cases. However, the Recovery routine accomplishes a roll forward throughout the other versions of the metadata block or a roll back through the other versions of the metadata block. In either case, the metadata is made to be transactionally consistent.

If the Recovery routine can read only one version of one area A, B of the metadata block, then the routine applies that version to the other versions. This effects either a roll back of all four versions of the metadata block or a roll forward in certain circumstances. In either case, the resulting metadata is transactionally consistent.

DAB Recovery—Pseudo-Code

This section sets forth the details of the program logic in the preferred embodiment for DAB Recovery referring to the pseudo-code in the Appendix. The top-level routine, called RecoverDAB, is provided first and followed by the pseudo-code routines that it calls. Note that for clarity and ease in illustrating the present invention, the pseudo-code makes several simplifying assumptions. These include:

Recovery is only of SegMap pagelets. Of course, the invention Recovery routine also recovers the other permanent map structure—the RootMap—during this process. And since each doublet identifies itself with a type field, the processes generalize to more than the one structure type.

Recovery is described of only one particular storage unit within the pool, identified by the SU (in practice, a pointer to the storage unit's UCB). It is understood that the Recovery routine similarly processes every storage unit within the pool.

Recovery is described of only one particular family. In practice, the doublets within A area and B area may include metadata blocks for several families. Therefore, the Recovery routine builds several SegMaps in parallel—one for each family on the target storage unit. Again, each doublet is self-identifying, and so one knows which SegMap it refers to.

The psuedo-code reads one doublet at a time. In practice, a contiguous batch of doublets is read from the disk for speed.

Some doublets in the A and B areas may never have been used to hold data at any prior point in the history of this storage unit's inclusion in the current pool. These doublets are recognized by their doublet signature and simply excluded from the Recovery algorithm as further explained below.

The pseudo-code subroutine ReadAndRepairDoublet checks the two disk blocks that comprise a doublet. Depending upon parity errors and which of the two has the higher transaction number, the subroutine returns the best in the first pagelet of DoubletBuf. In another embodiment, the (very infrequent) memcpy is avoided by augmenting the summary record returned by the subroutine ReadAndRepairDoublet.

An in-memory SegMap is simply an array of self-identifying SegMap entries (each eight bytes in size). It does not include a transaction header for each pagelet of memory (which would be a significant waste of precious system memory). Because of the space taken up at the start of each block in a doublet for the transaction header, each metadata block on disk therefore holds only 61 SegMap entries—not the whole 64 SegMap entries in each pagelet of the in-memory SegMap. Thus, rather than talk about a pagelet-within-SegMap in the pseudo-code, referenece is made to a "Lump". Thus Lump 0 corresponds to entries 0 through 60 of a SegMap, Lump 1 to the succeeding 61 entries and so on.

The Recovery routine below does not include the complications required to cope with the Lazy-Snap-Delete optimization discussed below.

In the absence of disk errors, the gist of doublet AB Recovery is quite simple: read the pagelet of each SegMap from disk that has the highest transaction number. If that pagelet was written by a transaction whose size was 1, then there is nothing more to do; i.e., the pagelet found is the most up-to-date, committed pagelet. However, if it was written as part of a multi-block transaction, the Recovery routine cannot be sure whether this newest pagelet is the one desired, or whether Recovery should roll back to its previous version. For example, suppose the current pagelet was one of three involved in transaction number 666. If, during Recovery, both of its buddies (i.e., pagelets whose transaction header records a transaction number of 666) are found, then one is assured that those newest pages are the up-to-date committed values. Conversely, if Recovery does not find its buddies, then the routine concludes that transaction 666 was in flight at the instant the system failed, and since not all of that transaction reached the disk, Recovery must roll back to that transaction's previous state. The Recovery algorithm maintains a list of such in-doubt transactions. Whenever it notices that all blocks of any transaction number have been read, that transaction is removed from the in-doubt list.

There is another factor, however, that prevents the in-doubt list from growing very large, and that helps speed the process of Recovery. That is, the TxHard field that is written as part of any writes of any metadata blocks. This field records the highest transaction number that is known to be hardened on-disk at the instant the write is dispatched. As such, during Recovery, as soon as a TxHard value of, say, 661, is seen, the routine may immediately remove any transactions from the in-doubt list whose transaction number is 661 or less.

Now for the details of the Appendix RecoverDAB pseudo-code:

The variable RecoverTxHard holds the highest value read so far from any doublet in the A or B area. Whenever a doublet whose TxNum is less than or equal to RecoverTx-Hard is read, it is concluded immediately that this transaction must have committed. Note that in normal operation, the TxHard field of any doublet represents the highest transaction number that was known to have definitely written, in its entirety, to the disk. So, for example, if at the instant that any doublet buffer for transaction with TxNum= 12345 is being assembled, the TxHard value is 12342, then that is the value for TxHard that is assembled into that doublet buffer. It may be that only the first block of the doublet for this particular write, for transaction 12345, reaches the disk before a crash. But that does not affect the validity of that doublet's TxHard value of 12342—this value still holds, indicating that transaction 12342 was definitely hardened to disk at some point previous to transaction 12345.

The variable SegSum is an array of records, one for each pagelet of the SegMap being recovered. The record holds several fields. See later (routine ReadAndRepairDoublet, parameter DoubletSum for details).

The variable SegLump holds the lump number within the current SegMap. Each time a doublet from the disk is read, its data is extracted into the next lump of the in-memory SegMap, and the value of the variable SegLump is adjusted by one. Note that this process in general reorders the entries within each SegMap on all nodes in the cluster. Note too that the routine always bumps the value of SegLump after attempting to read a doublet from the A area of disk, even if both blocks of that doublet return a parity error.

The variable DoubletNum is a loop counter through all the doublets held on this storage unit.

Note that the start DBN for the two areas for SnappyDisk metadata blocks are recorded stably in the fields MapSum.MetaStartDBNareaA and MapSum.MetaStartDBNareaB.

The variable DoubletBuf is a pointer to a two-pagelet buffer in memory used to hold the doublet read from disk. In the pseudo-code, DoubletBuf is treated it as a two-element array. Thus, DoubletBuf [0] points at the first pagelet of the buffer, whilst DoubletBuf [1] points at the second pagelet. Note that the phrase of pseudo-code "lookup the SegLump to which this doublet refers" presumes another data structure, built during recovery.

Figure 5:
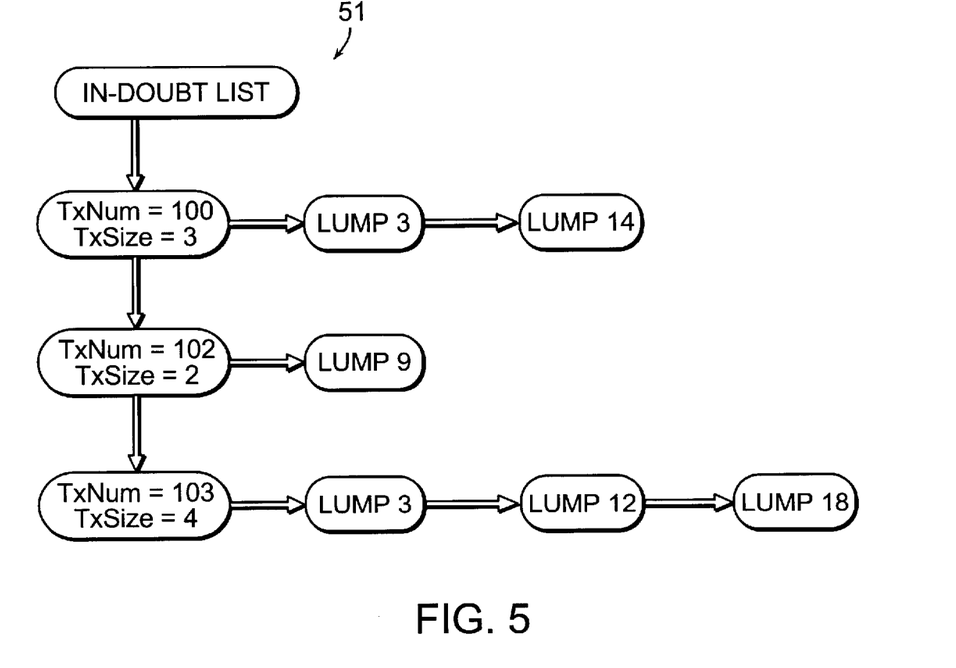
FIG. 5 is a schematic illustration of an in-doubt list employed by the embodiment of FIG. 4.

The in-doubt list 51 is structured as a list of transaction numbers, each of which is a list of in-doubt lumps. FIG. 5 is illustrative.

In this in-doubt list, transaction 100 has a TxSize of 3, but so far only two lumps of that transaction—numbers 3 and 14—have been encountered. Similarly, transaction 102 has a size of 2, but so far only one lump—number 9—has been encountered. In reality, this in-doubt list 51 would extend across all SegMaps for all storage units in the pool, so that each node (transaction numbers and lumps) in FIG. 5 will actually have additional attributes to ensure their identity is unique.

The variable DoubletSum returns the results of attempting to read the specified Doublet from the specified Storage Unit. It is a record with the following fields:

Status: GOOD or BAD. If GOOD, then the contents of DoubletBuf [0] are valid.

TxNum: the transaction number of the transaction stored in which this Doublet last took part.

TxSize: the size of the transaction in which this Doublet last took part.

TxHard: the value of TxHard at the time the transaction in which this Doublet last took part was written to disk.

AorB: records whether the data placed in the SegMap is drawn from area A or area B. (This field is set by the caller of routine ReadAndRepairDoublet).

The variable MetaDbn holds the Disk Block Number of the first block that makes up the target Doublet.

The variable ErrorStatus comprises a two-bit field that specifies whether a parity error on reading the two halves of a Doublet is obtained. So, for example, if block 0 is read without error, but a parity error on reading block 1 is encountered, the value of ErrorStatus returned will be: ErrorStatus[0]=GOOD and ErrorStatus [1]=BAD.

If a parity error is encountered while reading one block of a Doublet, then a call is made to routine RepairDoublet to copy the good block over the bad one. Note that this rewrite will normally not encounter a write parity error:

if the original read parity error is caused by a failure midway through writing the block to disk, then the parity error is not due to a bad block on the disk. The rewrite will encounter no problem.

if the original read parity error is caused by spontaneous decay of that block, then the rewrite will encounter no problem because the bad block has been revectored by the disk firmware.

If the rewrite encounters a problem, a warning is issued to the Error Log, that this Storage Unit is now operating at less than full resilience.

Routine WriteDoublet is analogous to ReadDoublet. Normally, its two-block write will simply succeed. In the very rare circumstance that it fails due to a write parity error, it will retry the two single-block writes separately and issue a warning if either of them fails.

Note that RollBack reads the older version of the specified lump into a doublet buffer. If either half of the doublet encounters a parity error (highly unlikely, since a previous step in the Recovery routine attempted to repair such read parity errors) then the routine copies the good half over the bad half. The Recovery routine then copies this older version of the doublet into the target lump of the in-memory SegMap.

It might be thought that this completes the rollback of this doublet. However, it is crucial that the routine overwrites the newer doublet, on-disk, with its older version. If the routine did not, then when normal operation resumes, a future Recovery might wrongly conclude that this rolled-back transaction has actually completed.

Restated, suppose doublets 1 and 2 of a given SegMap previously took part in transaction numbers 201 and 502, and these were written to area B. Transaction number 700, involving doublets 1 and 2 was due to write their new contents to the A area. However, only doublet 1 was written before the system crashed. On Recovery, the B area shows Doublet 1 with a transaction number of 201, and doublet 2 with a transaction number of 502. The A area shows doublet 1 with the in-flight transaction number of 700, whilst doublet 2 records a very old transaction number 302. Recovery will construct lump 1 of the SegMap from the A Doublet, with transaction number 700; and lump 2 from the B doublet with transaction number 502.

| Doublet/Lump | A Area | B Area | SegMap |
| --- | --- | --- | --- |
| 1 | 700 | 201 | 700 |
| 2 | 302 | 502 | 502 |

At the end of Recovery, the routine notes that transaction number 700 is in-doubt. The routine therefore rolls back the SegMap to look like this:

| Doublet/Lump | A Area | B Area | SegMap |
| --- | --- | --- | --- |
| 1 | 700 | 201 | 201 |
| 2 | 302 | 502 | 502 |

Subsequently, say the file system writes transaction 701, and later transaction 702, the latter with a TxHard of 701. If neither affect doublet 1, then a Recovery at that instant would falsely conclude that doublet 1 should take its A area value—after all, it sees a TxHard of 701 and therefore concludes that transaction 700 must have been successfully committed.

The invention method and apparatus prevents this error of rolling forward a part-complete transaction. In the preferred embodiment, the invention routine eradicates all persistent record that any rolled-back transaction ever existed, by overwriting each doublet involved in that transaction with its older version. Thus, Recovery would create the following in the instant example:

| Doublet/Lump | A Area | B Area | SegMap |
| --- | --- | --- | --- |
| 1 | 201 | 201 | 201 |
| 2 | 302 | 502 | 502 |

DAB Persistence—Advance of TxHard

The description of the recovery routine above simply assumed that each block of each doublet included a transaction header that included two key fields—TxNum and TxHard. It turns out that both these values must be maintained, in step, around all nodes in the cluster. Moreover, in order for the transaction process, and Recovery routine, to work correctly, the present invention must impose a constraint upon the order in which independent transactions are made visible.

In order to further explain the problem that must be solved, consider the situation where TxHard=100. Writes to perform two concurrent transactions are issued as follows: TxNum 101 updates doublets 30 and 33; TxNum 102 updates doublet 31. The transaction header for these target doublets has a TxHard value of 100.

Suppose next that transaction 12 completes. The contents of the target doublets are then as follows:

| Doublet 30     | Doublet 31     | Doublet 32 | Doublet 33    |
|----------------|----------------|------------|---------------|
| TxNum = 101    | TxNum = 102    | ?          | TxNum = 2     |
| TxSize = 2     | TxSize = 1     | ?          | TxSize = 1    |
| TxHard = 100   | TxHard = 100   | ?          | TxHard = 1    |

Doublet 30 has been written—one half of transaction 101. Doublet 31 has been written—all of transaction 102, which therefore completes ahead of transaction 101.

It should be clear that one could not yet advance TxHard beyond its current value of 100. Suppose, to the contrary, one set TxHard=102, then write transaction 103, to update doublet 32, with this new TxHard value. Suppose too that transaction 103 completes ahead of transaction 101. The following results:

| Doublet 30     | Doublet 31     | Doublet 32     | Doublet 33    |
|----------------|----------------|----------------|---------------|
| TxNum = 101    | TxNum = 102    | TxNum = 103    | TxNum = 2     |
| TxSize = 2     | TxSize = 1     | TxSize = 1     | TxSize = 1    |
| TxHard = 100   | TxHard = 100   | TxHard = 102   | TxHard = 1    |

Transactions 102 and 103 are complete, but one is still waiting for the write of doublet 33 that makes up the second half of transaction 101.

What if the system crashes at this instant? Recovery will see a TxHard of 102 (in the shaded box of doublet 32) and therefore conclude that all transaction numbers 102 or less were completed. In particular, it will conclude that transaction 101 was complete and need to not be rolled back. But in arriving at this conclusion Recovery will have completely lost the other half of that transaction, using instead some ancient version of doublet 33.

The answer to this problem is: one can only advance the in-memory value of TxHard when one has received the completion for all intermediate TxNums. For example, suppose TxHard is currently 100, and transactions 101 through 108 are in-flight. If transaction 103 completes, one cannot yet advance TxHard. If transaction 101 completes next, one can advance TxHard to 101. If transaction 102 completes next, one can advance TxHard to 103, and so on. This technique requires that one keep a list of those transactions that complete, but which do not allow TxHard to advance. A suitable list would look like the example below:

| Completing TxNum | TxHard | Completed List |
|------------------|--------|----------------|
|                  | 100    | nil            |
| 103              | 100    | 103            |
| 101              | 101    | 103            |
| 102              | 103    | nil            |
| 107              | 103    | 107            |
| 106              | 103    | 106, 107       |
| 105              | 103    | 105, 106, 107  |
| 104              | 107    | nil            |

Start with a TxHard value of 100 and an empty completed list. In the next row of the table, transaction 103 completes. This is not adjacent to TxHard, so the invention method/routine places 103 on the completed list. Next, transaction 101 completes. This allows the invention routine/method to advance TxHard to 101, still leaving 103 on the completed list. Next transaction 102 completes. This allows the invention routine to empty the completed list and advance TxHard to 103. The next three transactions to complete, 107 down to 105, are added to the completed list. Finally, transaction 104 completes, and allows the routine to empty the completed list and advance TxHard to 107.

Note that because of the way that transactions are dispatched via a ShopList, it is possible that doublets which are part of the same transaction may be written with different TxHard values in their transaction header.

DAB Persistence—Serializability

The previous section described the mechanism used to control the advance of TxHard. However, there is a second problem that could arise without a further subtle constraint concerned with transaction completion. In order to guarantee a correct transaction and Recovery scheme, the invention method/routine must not allow dependent transactions to progress in a way that destroys serializability. The following explains the problem using an example.

Suppose the state of the A and B areas for doublets 1 through 9 is as shown below. To simplify the story, assume that doublets 1 through 9 have been written in the A area, one at a time, by transaction numbers 1 through 9. Thus, TxHard lags one behind TxNum. Next, doublets 1 through 9 were written, again, one at a time, into the B area.

| Doublet  | 1  | 2  | 3  | 4  | 5  | 6  | 7  | 8  | 9  |
|----------|----|----|----|----|----|----|----|----|----|
| A TxNum  | 1  | 2  | 3  | 4  | 5  | 6  | 7  | 8  | 9  |
| A TxSize | 1  | 1  | 1  | 1  | 1  | 1  | 1  | 1  | 1  |
| A TxHard | 0  | 1  | 2  | 3  | 4  | 5  | 6  | 7  | 8  |
| B TxNum  | 10 | 11 | 12 | 13 | 14 | 15 | 16 | 17 | 18 |
| B TxSize | 1  | 1  | 1  | 1  | 1  | 1  | 1  | 1  | 1  |
| B TxHard | 9  | 10 | 11 | 12 | 13 | 14 | 15 | 16 | 17 |

This diagram shows that the in-memory SegMap is constructed from the latest version of each doublet—the ones shown unshaded—all in the B area. Also, it shows that the next update for doublets 1 through 9 will be directed at the shaded doublets—all in the A area. (Recall that this latter information is captured in the toggle structure).

Note that if the system crashed at this instant, then Recovery would correctly reconstruct this situation. It would select transactions 10 through 17 for its in-memory SegMap because it has seen a TxHard of 17. And it will select transaction 18's version of doublet 9 because that transaction is found to be complete (i.e., Recovery successfully finds all the doublets involved in transaction 18—in this case, there is just one. Such transactions, involving just one doublet, occur very frequently in SnappyDisk, so Applicants give it the special name of unary transaction. Applicants call any transaction that is non-unary a compound transaction.)

With this starting picture, assume two concurrent transactions issue: transaction 19 is large, updating doublets 1 through 7 inclusive. Transaction 20 is small, updating doublets 8 and 9. TxHard for both is 18. The smaller transaction 20 completes first. The picture on-disk then looks as follows:

| Doublet | 1 | 2 | 3 | 4 | 5 | 6 | 7 | 8 | 9 |
|---|---|---|---|---|---|---|---|---|---|
| A TxNum | 19 | 19 | 3 | 4 | 5 | 6 | 7 | 20 | 20 |
| A TxSize | 7 | 7 | 1 | 1 | 1 | 1 | 1 | 2 | 2 |
| A TxHard | 18 | 18 | 2 | 3 | 4 | 5 | 6 | 18 | 18 |
| B TxNum | 10 | 11 | 12 | 13 | 14 | 15 | 16 | 17 | 18 |
| B TxSize | 1 | 1 | 1 | 1 | 1 | 1 | 1 | 1 | 1 |
| B TxHard | 9 | 10 | 11 | 12 | 13 | 14 | 15 | 16 | 17 |

One can see that transaction 20, with size 2, has completed its updates to doublets 8 and 9 in the A area. Meanwhile, transaction 19, with size 7, is still grinding its way through—so far it has updated doublets 1 and 2, with 3 through 6 still to do.

If the system were to crash at this instant, Recovery would roll back transaction 19, by overwriting 'A' doublets 1 and 2 with their 'B' versions. However, transaction 20 would be found complete and duly rolled forward. One would end up with the configuration shown below:

| Doublet | 1 | 2 | 3 | 4 | 5 | 6 | 7 | 8 | 9 |
|---|---|---|---|---|---|---|---|---|---|
| A TxNum | 10 | 11 | 3 | 4 | 5 | 6 | 7 | 20 | 20 |
| A TxSize | 1 | 1 | 1 | 1 | 1 | 1 | 1 | 2 | 2 |
| A TxHard | 9 | 10 | 2 | 3 | 4 | 5 | 6 | 18 | 18 |
| B TxNum | 10 | 11 | 12 | 13 | 14 | 15 | 16 | 17 | 18 |
| B TxSize | 1 | 1 | 1 | 1 | 1 | 1 | 1 | 1 | 1 |
| B TxHard | 9 | 10 | 11 | 12 | 13 | 14 | 15 | 16 | 17 |

As before, the clear boxes show which doublets the recovery routine selects to populate the in-memory SegMap, whilst the shaded doublets show the state of the toggle structure. This represents a transactionally consistent state.

Referring back to the situation before the example system crash, transaction 19 is underway and transaction 20 has been written to the A area. At this instant, we know we cannot advance TxHard, as discussed above. However, let's assume one can toggle transaction 20's doublets, unlock its doublets, and acknowledge completion to the caller. The configuration at this instant is therefore:

| Doublet | 1 | 2 | 3 | 4 | 5 | 6 | 7 | 8 | 9 |
|---|---|---|---|---|---|---|---|---|---|
| A TxNum | 19 | 19 | 3 | 4 | 5 | 6 | 7 | 20 | 20 |
| A TxSize | 7 | 7 | 1 | 1 | 1 | 1 | 1 | 2 | 2 |
| A TxHard | 18 | 18 | 2 | 3 | 4 | 5 | 6 | 18 | 18 |
| B TxNum | 10 | 11 | 12 | 13 | 14 | 15 | 16 | 17 | 18 |
| B TxSize | 1 | 1 | 1 | 1 | 1 | 1 | 1 | 1 | 1 |
| B TxHard | 9 | 10 | 11 | 12 | 13 | 14 | 15 | 16 | 17 |

Next, suppose one issues and completes transaction 21, an update to doublet 9 is written to the B area. And again, one toggles and unlocks transaction 21's doublet, and obtains:

| Doublet | 1 | 2 | 3 | 4 | 5 | 6 | 7 | 8 | 9 |
|---|---|---|---|---|---|---|---|---|---|
| A TxNum | 19 | 19 | 19 | 19 | 5 | 6 | 7 | 20 | 20 |
| A TxSize | 7 | 7 | 7 | 7 | 1 | 1 | 1 | 2 | 2 |
| A TxHard | 18 | 18 | 18 | 18 | 4 | 5 | 6 | 18 | 18 |
| B TxNum | 10 | 11 | 12 | 13 | 14 | 15 | 16 | 17 | 21 |
| B TxSize | 1 | 1 | 1 | 1 | 1 | 1 | 1 |  | 1 |
| B TxHard | 9 | 10 | 11 | 12 | 13 | 14 | 15 | 16 | 18 |

Notice how the long-running transaction 19 has now updated doublets 1 through 4. Note that TxHard remains set at 18, to conform to our earlier constraint.

At this instant, Recovery would roll back transaction 10, overwriting A doublets 1 through 4 with their B versions. For doublet 8, the invention routine would choose the newer A version. For doublet 9, it would choose the newer B version. The unary transaction 21 would be viewed as complete and therefore rolled forward. But transaction 20 would be seen as incomplete. Recovery would therefore conclude it should roll back transaction 20 by over-writing A doublet 8 with its B version. Recovery would therefore construct the following configuration:

| Doublet | 1 | 2 | 3 | 4 | 5 | 6 | 7 | 8 | 9 |
|---|---|---|---|---|---|---|---|---|---|
| A TxNum | 10 | 11 | 12 | 13 | 5 | 6 | 7 | 17 | 20 |
| A TxSize | 1 | 1 | 1 | 1 | 1 | 1 | 1 | 1 | 2 |
| A TxHard | 9 | 10 | 11 | 12 | 4 | 5 | 6 | 16 | 18 |
| B TxNum | 10 | 11 | 12 | 13 | 14 | 15 | 16 | 17 | 21 |
| B TxSize | 1 | 1 | 1 | 1 | 1 | 1 | 1 |  | 1 |
| B TxHard | 9 | 10 | 11 | 12 | 13 | 14 | 15 | 16 | 18 |

Alas this configuration is not transactionally consistent because there is no sequence of one-at-a-time transactions that would have constructed this state. It shows a mixture of the effects of transactions 20 and 21. Specifically, B doublet 9, selected for the in-memory SegMap, includes the entry updated by transaction 20 as well as that updated by transaction 20; but doublet 8 does not include the entry updated by transaction 20. Recovery has thus constructed a state that never existed at any one instant in the history of the pool—a state that now includes only half of transaction 20's action. By prematurely unlocking doublets, the example has allowed transactions to interfere in such a way that serializability is destroyed. This would be a catastrophe!

Why precisely has this problem arisen? And how does the present invention solve it? The corruption arose because the Recovery routine decided to roll back transaction 20 but not transaction 21 that had superseded part of transaction 20. Why did Recovery decide this? Because 20 was higher than the highest on-disk TxHard. It thus seems that the invention routine/method needs to avoid updating any doublet until the transaction which previously updated that doublet is unconditionally committed—that is to say, Recovery will not roll it back. There are three ways in which the invention can assure that Recovery will never roll back any given transaction:

1. A unary transaction is never rolled back.
2. A compound transaction is never rolled back if it is complete. In other words, all doublets which it updated are still present on-disk, and are the ones (from A and B areas) which Recovery would select—those with the higher TxNum.

3. A compound transaction, numbered TxNum, is never rolled back if there is a TxHard somewhere on-disk such that TxHard>=TxNum.

Clearly, one simple but brutal solution to the serializability problem would be to allow only one transaction in-flight at any instant. Then TxHard would always be one less than the transaction number in-flight, and the invention routine would never create a situation where Recovery would corrupt serializability.

A more elegant solution, which provides better concurrency, is to hold onto the locks for transaction number TxNum until any other transaction writes a TxHard on-disk such that TxHard>=TxNum. But this condition clearly includes a catch-22 problem—what if transaction TxNum is the last of a run of concurrent transactions just awaiting completion—there is no subsequent transaction that can write a TxHard equal to TxNum. But in this case, one can drop the locks for transaction TxNum, assured that Recovery is safe under clause 2 above.

This solution, of delaying lock release, in effect forces a sequence of transactions to be completed in order. Thus, although concurrent transactions can be dispatched in parallel to update the disk, they cannot complete and so release their locks in any order, except that in which they were allocated TxNums.

A third solution to ensure serializability is to drop locks as soon as that transaction completes, but stall issuing any further transaction that would break serializability. On the face of it, this would seem to provide even more concurrency, since it would allow regular I/O's which require only read access to SegMaps (a read, or a write that does not provoke a copy-in or copy-out operation) to proceed. However, in most computer systems the overwhelming number of transactions in regular SnappyDisk operation is expected to be unary, rather than compound transactions.

According to the foregoing, the invention method and apparatus includes a new field in the transaction headlet in each metadata block. The new transaction headlet now has the following format:

TxNum.Sequence#.TxSize where sequence# is, for example, part n of total number of parts in the subject transaction (TxNum).

DAB Persistence—An Optimization

Note that ABC and DAB Recovery schemes work no matter how many transactions might have been in-flight at the time of system failure. However, if the number of metadata blocks is large, the in doubt list can grow quite large as Recovery proceeds. There is a simple technique the invention method may use to improve upon this situation and therefore make Recovery faster and require less memory. It is the well-trodden path of marking a pool as cleanly dismounted, thus:

If SnappyDisk dismounts the disk 'cleanly', it can indicate this fact by one final write to a special metadata block—the Map Summary metadata block. On remount, Recovery checks this field first. It if finds the disk was 'cleanly' dismounted, then there are no in-doubt transactions to be recovered and the metadata is already transactionally consistent.

While this invention has been particularly shown and described with references to preferred embodiments thereof, it will be understood by those skilled in the art that various changes in form and details may be made therein without departing from the spirit and scope of the invention as defined by the appended claims.

```
Routine Recover DAB (SU)
      read MapSum summary from disk
      MaxDoublet = Mapsum.MaxDoublet
      Recover TXHard = 0              !highest TXHard value seen so far during Recovery
      SegSum [ ] = {BAD,0,0,A}         !initialize the summary of SegMap pagelets array
      SegLump = 0                     !Lump # within SegMap being recovered
      ! First process every Doublet in the A area.
      MetaDbnA = MapSum.MetaStartDbnAreaA
      for DoubletNum = 0 to MapSum.MaxDoublet
            SegRec = SegSum [SegLump]
            ReadAndRepairDoublet (SU, MetaDbnA; DoubletBuf, SegRec)
            ++SegLump
            If SegRec.status = = GOOD then
                  extract data from DoubletBuf [0] into Lump SegLump of SegMap
                  If SegRec.TxHard > RecoverTxHard then
                        Recover TXHard = SegRec.TxHard
                        remove any now-resolved Lumps from the in-doubt list
                  endif
            endif
      endfor
      MaxSegLump = SegLump
      !Next process the B area. If B is newer than its partner A, then use B for the SegMap
pagelet.
      MetaDbnB = MapSum.MetaStartDbnAreaB
      for DoubletNum = 0 to Mapsum.MaxDoublet
            ReadAndRepairDoublet (SU, MetaDbnB; DoubletBuf, SegRec)
            SegLump = DoubletNum
            if   (SegRec.Status = = GOOD)                      &&
                  SegSum [ SegLump]. Status = = GOOD           &&
                  SegRec.TxNum > SegSum [ SegLump].TxNum)      ||
                  (SegRec.Status = = GOOD)                      &&
                  SegSum [ SegLump].Status == BAD)             then
                  extract data from DoubletBuf [0] into SegMap [ SegLump]
                  SegSum [ SegLump] = SegRec
                  SegSum [ SegLump].AorB = B
            endif
```

```
            if SegRec.TxHard > RecoverTxHard then
                RecoverTxHard = SegRec.TxHard
                remove any now resolved Lumps from the in-doubt list
            endif
        endfor
        !Now step through the Lumps of the SegMap to decide whether to roll forward or roll back.
        for SegLump = 0 to MaxSegLump do
            if SegSum [SegLump].TxSize > 1 and Segsum [SegLump].TxNum > RecoverTxHard then
                add current SegMap Lump to the in-doubt list
            endif
        endfor
        !Now roll back all those transactions left on the in-doubt list.
        for all transaction numbers TxInDoubt on the in-doubt list do
            for each SegMap Lump within transaction number TxInDoubt
                RollBack (SegMap, SegSum, SegLump, MetaDbnA, MetaDbnB, DoubletBuf)
                remove current SegMap Lump from the in-doubt list
            endfor
        endfor
        build hash collision chains for the now-recovered SegMap
EndRoutine RecoverDAB
Routine ReadAndRepairDoublet (SU, MetaDbn; DoubletBuf, DoubleSum)
        !Read the Doublet stored starting at DBN MetaDbn on Storage Unit SU into DoubletBuf.
        !Repair either of its blocks if we detect a parity error. Move the block to be used for
        !recovery into DoubletBuf[0].
        ErrorStatus = ReadDoublet (SU, MetaDbn, DoubletBuf)
        RepairDoublet (SU, MetaDbn, DoubletBuf, ErrorStatus)
        if ErrorStatus [0] = = BAD and ErrorStatus [1] = = BAD then
            DoubletSum = {BAD,0,0,0}
            Write warning entry of double-block failure to Error Log
        else
            if ErrorStatus [0] = = GOOD and ErrorStatus [1] = = GOOD then
                if DoubletBuf [0].TxNum < DoubletBuf[1].TxNum then
                    DoubletBuf [0] = DoubletBuf [1]
                endif
            elseif ErrorStatus [0] = = BAD and ErrorStatus [1] = = GOOD then
                DoubletBuf [0] = DoubletBuf [1]
            endif
            DoubletSum = {GOOD, DoubletBuf [0].TxNum, DoubletBuf [0].TxSize, DoubletBuf
               [0].TxHard}
        endif
EndRoutine ReadAndRepairDoublet
Routine ReadDoublet (SU, DBN DoubletBuf): ErrorStatus
        status ReadBlocks (SU, DBN, 2, DoubletBuf)
        if status = = GOOD then
            ErrorStatus [0] = Error Status [1] = GOOD
        else
            ErrorStatus [0] = ReadBlocks (SU, DBN, 1, DoubletBuf [0])
            ErrorStatus [1] = ReadBlocks (SU, DBN + 1, 1, DoubletBuf [1])
        endif
EndRoutine ReadDoublet
Routine RepairDoublet (SU, DBN, DoubletBuf, ErrorStatus)
        if ErrorStatus [0] = = GOOD && ErrorStatus [1] = = BAD then
            WriteDoublet (SU, DBN, DoubletBuf [0])
        elseif ErrorStatus [0] = = BAD && ErrorStatus [1] = = GOOD then
            WriteDoublet (SU, DBN, 2, DoubletBuf [1])
        endif
EndRoutine RepairDoublet
Routine WriteDoublet (SU, DBN, DoubletBuf)
        status = WriteBlocks (SU, DBN, 2, DoubletBuf)
        if status = = BAD then
            status = WriteBlocks (SU, DBN, 1, DoubletBuf [0])
            if status = = BAD then
                Write warning entry to Error Log
            endif
            status = WriteBlocks (SU, DBN + 1, 1, DoubletBuf [1])
            if status = = BAD then
                Write warning entry to ErrorLog
            endif
        endif
EndRoutine WriteDoublet
Routine RollBack (SegMap, SegSum, SegLump, DbnA, DbnB, DoubletBuf)
        if SegSum [SegLump].AorB = = A then
            Error Status = ReadDoublet (SU, DbnB, DoubletBuf)
            if ErrorStatus [0] = = BAD then
                DoubletBuf [0] = DoubletBuf [1]
            elseif Error Status [1] = = BAD then
                DoubletBuf [1] = DoubletBuf [1]
            endif
            extract data from DoubletBuf [0] into SegMap [SegLump]
```

```
        WriteDoublet (SU, DbnA, DoubletBuf)
    else
        ErrorStatus = ReadDoublet (SU, DbnA, DoubletBuf)
        if ErrorStatus [0] = = BAD then
            DoubletBuf [0] = DoubletBuf [1]
        elseif ErrorStatus [1] = = BAD then
            DoubletBuf [1] = DoubletBuf [0]
        endif
        extract data from DoubletBuf [0] into SegMap [SegLump]
        WriteDoublet (SU, DbnB, DoubletBuf)
    endif
EndRoutine RollBack
```

What is claimed is:

1. Computer memory apparatus for maintaining metadata, the metadata correlating a physical memory and a corresponding virtual memory to each other, the apparatus comprising:

a first area of the physical memory storing blocks of metadata, for each block of metadata, the first area storing the block and a duplicate of the block of metadata; and a second area of the physical memory, the second area spaced apart from the first area of the physical memory, and for each block of metadata, the second area storing a copy of the block and a copy of the duplicate of the block of metadata, for each block of metadata, the block and the duplicate of the block in the first and second areas enabling the metadata to survive a single block failure of an underlying media of the physical memory during writing of the metadata to the first and second areas.

2. Apparatus as claimed in claim 1 further comprising:

for each block of metadata, a header indicating (a) update transaction and (b) certain part in a plurality of parts of the transaction, of the metadata block.

3. Apparatus as claimed in claim 1 wherein the first and second areas of physical memory allow a single block of metadata to be updated in less than three I/O operations.

4. Apparatus as claimed in claim 3 further comprising update means for updating a block of metadata, the update means updating the block of metadata in one of the first area and the second area, by alternating between the first and second areas for each update of the block of metadata.

5. Apparatus as claimed in claim 4 wherein the update means provides rollback of a block of metadata, from the second area to the first area, if an I/O operation fails to complete updating the block of metadata in the first area.

6. Apparatus as claimed in claim 4 wherein the update means provides rollforward of a block of metadata from the first area to the second area, if an I/O operation fails to complete updating the block of metadata in the second area.

7. Apparatus as claimed in claim 1 wherein the physical memory and virtual memory form a snappy disk.

8. In a computer system having physical memory, corresponding virtual memory, and metadata for indicating correspondence between physical and virtual memory, a method of maintaining the metadata comprising the steps of:

providing a first area in physical memory for storing metadata;

providing a second area separate from the first area in the physical memory, for storing a copy of the metadata stored in the first area;

for each block of metadata, (i) writing the block and a duplicate of the block in the first area, and (ii) copying in the second area, the block and the duplicate of the block from the first area, said writing of a block and respective duplicate, in each of the first and second areas, is performed in less than three I/O operations and in a manner that survives a single block failure of an underlying media of the physical memory.

9. The method of claim 8 further comprising:

for each block of metadata, providing an indication of (a) update transaction and (b) part in a plurality of parts of the transaction.

10. The method of claim 8 further comprising the step of using a single I/O operation, updating a block of metadata stored in the first and second areas.

11. The method of claim 10 wherein the step of updating a block of metadata includes alternating between the first and second areas, for each update of the block of metadata.

12. The method of claim 11 wherein the step of updating further includes rolling back the block of metadata from the second area to the first area, if an I/O operation fails to complete updating of the block of metadata in the first area.

13. The method of claim 11 wherein the step of updating further includes rolling forward the block of metadata from the first area to the second area, if an I/O operation fails to complete updating the block of metadata in the second area.

14. The method of claim 8 wherein the physical memory is formed of a plurality of storage units.

15. A computer disk system having (a) physical memory formed by a plurality of storage units, (b) corresponding virtual memory and (c) metadata for mapping between addresses of virtual memory and addresses of physical memory, the computer disk system comprising:

maintenance means for maintaining metadata, the maintenance means including:

(i) a first area of the physical memory for storing blocks of metadata, for each block of metadata, the first area storing the block and a duplicate of the block of metadata; and (ii) a second area of the physical memory, the second area spaced apart from the first area of the physical memory, and for each block of metadata, the second area storing a copy of the block and the duplicate of the block of metadata, for each block of metadata, the maintenance means storing the block and duplicate of the block, in the first and second areas, in a manner such that the metadata survives a single block failure of an underlying media of the physical memory.

16. A computer disk system as claimed in claim 15 further comprising:

for each block of metadata, a header indicating (a) update transaction and (b) certain part in a plurality of parts of the transaction, of the metadata block.

17. A computer disk system as claimed in claim 15 wherein said maintenance means updates a single block of metadata in a less than three I/O operations.

18. A computer disk system as claimed in claim 17 wherein said maintenance means updates a block of metadata by alternating between the first and second areas, for each update of the block of metadata.

19. The computer disk system as claimed in claim 18 wherein the maintenance means rolls back a block of metadata from the second area to the first area, upon an I/O operation failing to complete updating the block of metadata in the first area.

20. The computer disk system as claimed in claim 18 wherein the maintenance means rolls forward a block of metadata from the first area to the second area, upon an I/O operation failing to complete updating the block of metadata in the second area.

* * * * *